(12) United States Patent
Ruecker

(10) Patent No.: US 10,111,524 B2
(45) Date of Patent: Oct. 30, 2018

(54) FURNITURE FITTING

(71) Applicant: Julius Blum GmbH, Hoechst (AT)

(72) Inventor: Marco Ruecker, Hohenems (AT)

(73) Assignee: JULIUS BLUM GMBH, Hoechst (AT)

( * ) Notice: Subject to any disclaimer, the term of this patent is extended or adjusted under 35 U.S.C. 154(b) by 678 days.

(21) Appl. No.: 14/807,973

(22) Filed: Jul. 24, 2015

(65) Prior Publication Data

US 2015/0327679 A1    Nov. 19, 2015

Related U.S. Application Data

(63) Continuation of application No. PCT/AT2014/000007, filed on Jan. 15, 2014.

(30) Foreign Application Priority Data

Jan. 30, 2013   (AT) ........................ 64/2013

(51) Int. Cl.
| | |
|---|---|
| *E05F 5/02* | (2006.01) |
| *A47B 96/00* | (2006.01) |
| *A47B 95/00* | (2006.01) |
| *F16B 7/18* | (2006.01) |
| *E05C 19/16* | (2006.01) |
| *E05B 63/00* | (2006.01) |

(52) U.S. Cl.
CPC ............ *A47B 96/00* (2013.01); *A47B 95/00* (2013.01); *E05C 19/165* (2013.01); *F16B 7/18* (2013.01); *E05B 63/0056* (2013.01); *Y10T 403/32598* (2015.01)

(58) Field of Classification Search
CPC ..... E05F 5/02; E05F 5/025; E05F 5/06; E05F 5/08; E05F 5/027; E05F 5/10; A47B 88/473; A47B 88/477; A47B 95/00
See application file for complete search history.

(56) References Cited

U.S. PATENT DOCUMENTS

| | | | |
|---|---|---|---|
| 7,234,569 B2 | 6/2007 | Salice | |
| 8,240,088 B2 | 8/2012 | Tarrega Lloret | |
| 2004/0201154 A1 | 10/2004 | Salice | |
| 2005/0268432 A1 | 12/2005 | Migli | |
| 2006/0220284 A1 | 10/2006 | Holzapfel | |

(Continued)

FOREIGN PATENT DOCUMENTS

| | | |
|---|---|---|
| AT | 12 439 | 5/2012 |
| CN | 1699719 | 11/2005 |
| CN | 201406923 | 2/2010 |

(Continued)

OTHER PUBLICATIONS

Chinese Office Action dated Mar. 4, 2016 in Chinese Application No. 201480006453.3.

(Continued)

*Primary Examiner* — Daniel J Wiley
(74) *Attorney, Agent, or Firm* — Wenderoth, Lind & Ponack, L.L.P.

(57) ABSTRACT

A furniture fitting includes a slide which is moveable linearly in relation to a housing and has a first slide part with an internal thread and a second slide part with an external thread interacting with the internal thread. The length of the slide is adjustable by rotation of the external thread relative to the internal thread, and a securing element prevents the external thread from unscrewing completely from the internal thread.

19 Claims, 15 Drawing Sheets

(56) References Cited

U.S. PATENT DOCUMENTS

2009/0119998 A1   5/2009   Tarrega Lloret
2014/0001938 A1   1/2014   Migli

FOREIGN PATENT DOCUMENTS

| | | |
|---|---|---|
| CN | 101435478 | 9/2012 |
| DE | 1 784 817 | 1/1972 |
| DE | 199 31 362 | 5/2001 |
| DE | 20 2006 006 422 | 9/2006 |
| DE | 20 2009 013 715 | 6/2010 |
| DE | 10 2007 022 269 | 9/2010 |
| EP | 2 299 041 | 3/2011 |
| JP | 2001-173311 | 6/2001 |
| JP | 2004-316912 | 11/2004 |
| JP | 2007-315017 | 12/2007 |
| JP | 2009-114847 | 5/2009 |
| WO | 2006/004237 | 1/2006 |
| WO | 2008/138437 | 11/2008 |
| WO | 2012/128730 | 9/2012 |

OTHER PUBLICATIONS

International Search Report (ISR) dated May 30, 2014 in International (PCT) Application No. PCT/AT2014/000007.
Austrian Search Report (ASR) dated Jul. 11, 2013 in Austrian Patent Application No. A 64/2013.

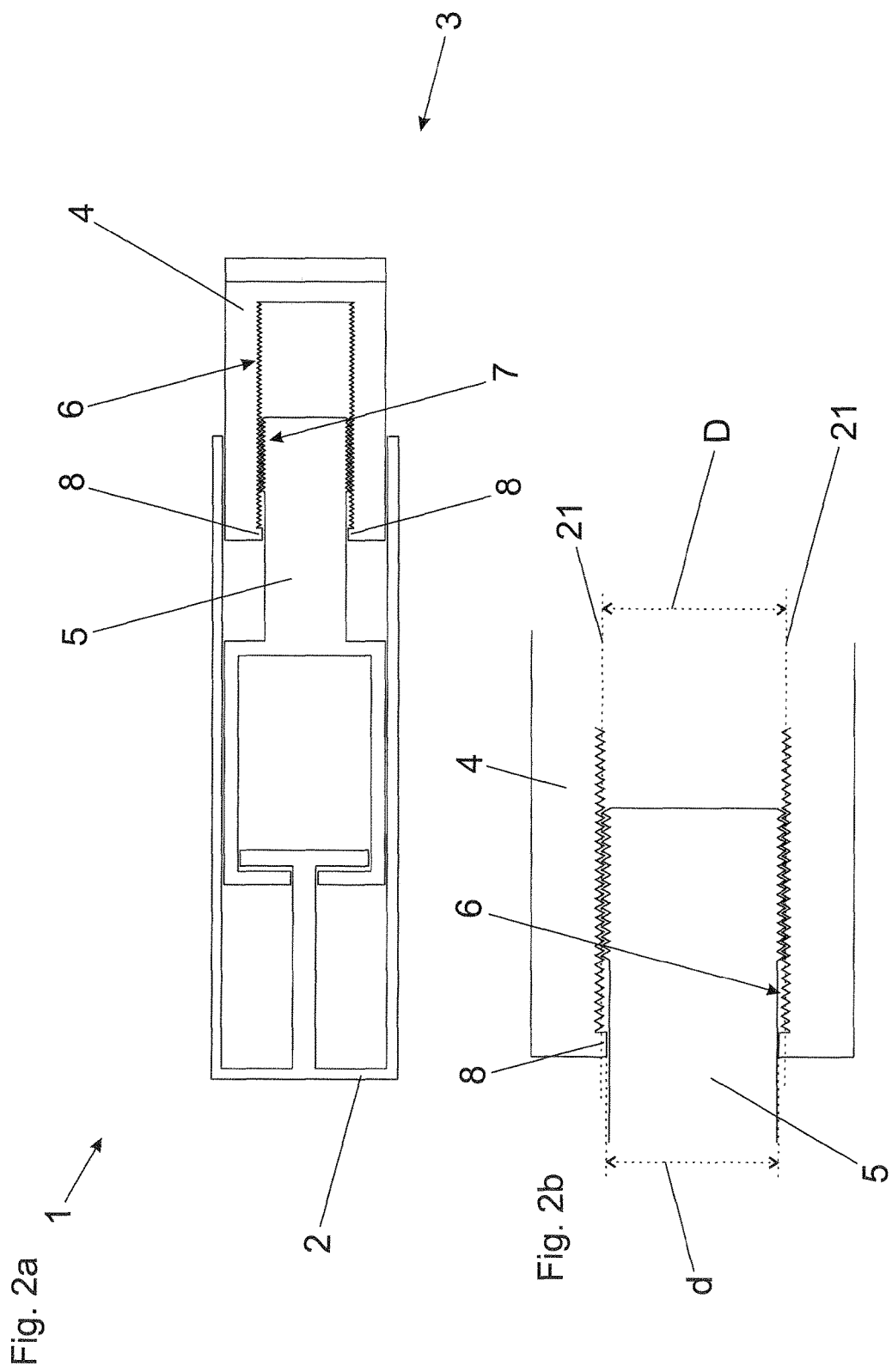

Fig. 4a
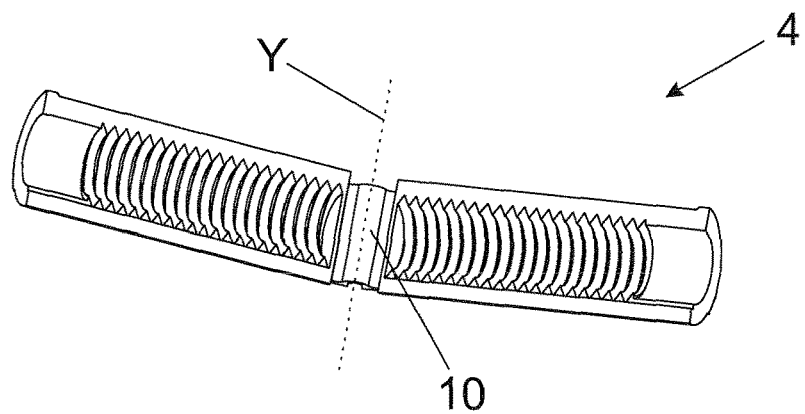
Fig. 4c
Fig. 4b
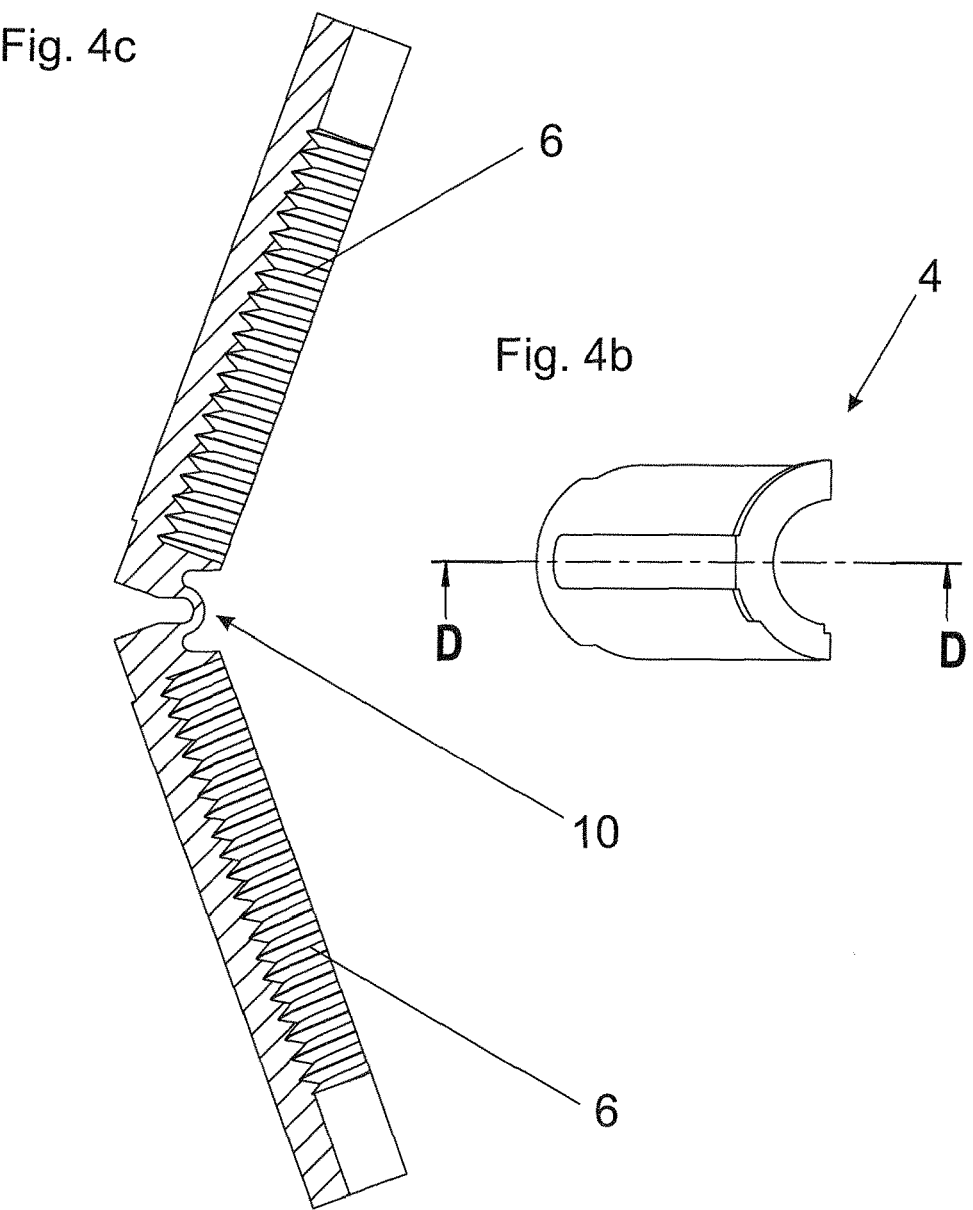

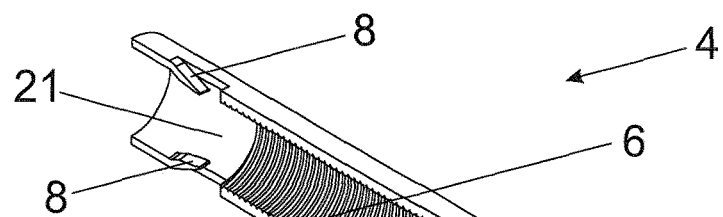
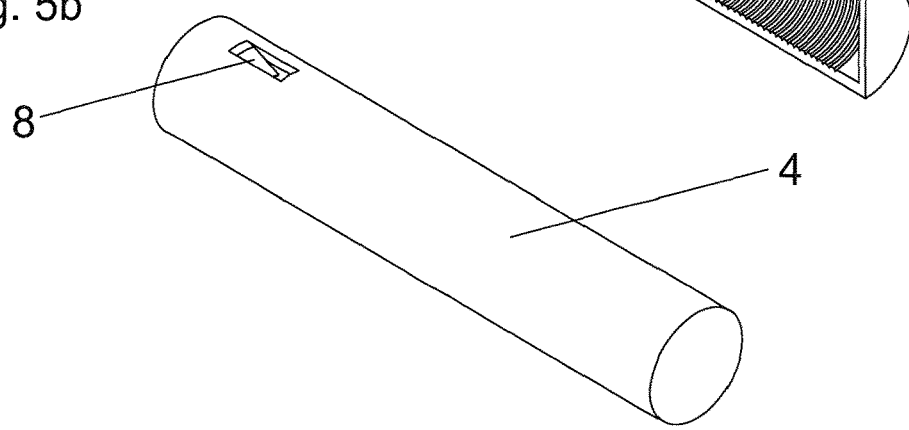
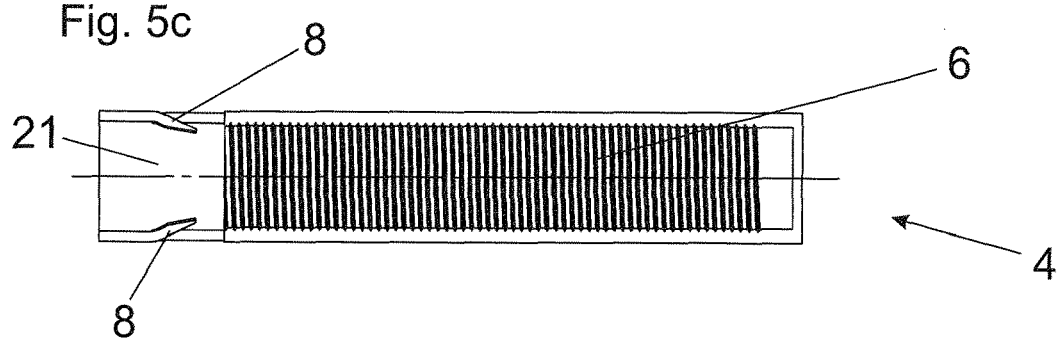
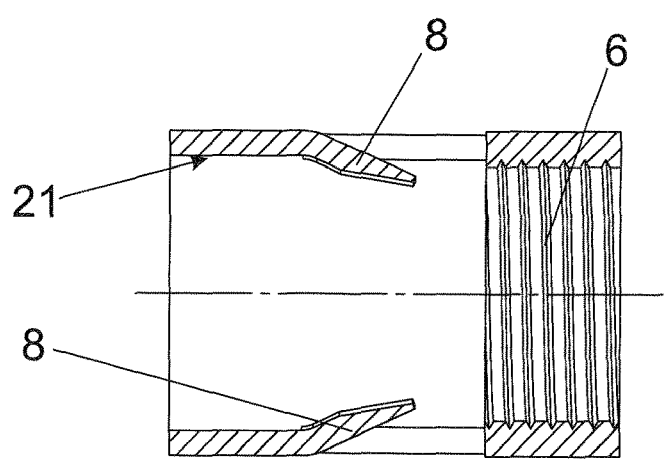

FURNITURE FITTING

BACKGROUND OF THE INVENTION

The present invention relates to a furniture fitting.

Furniture fittings of the type in question have a plunger which can be adjusted in length by a threaded connection. An example of these fittings would be touch-latch units, which for example allow furniture parts to be opened with the aid of a prestressed spring element.

DE 10 2007 022 269 B4 discloses a furniture fitting of the type in question. The plunger therein, comprising two plunger parts, can indeed be adjusted in length by a threaded connection. If, however, one plunger part is unscrewed as far as possible, it may be the case that the internal thread on the one plunger part no longer interacts with the external thread on the other plunger part. Although there is a stop present, which prevents the two plunger parts from being released from one another entirely, it makes operation more difficult. This is because, in order to re-establish the threaded connection, it is always necessary, in the first instance, for the internal thread to be correctly positioned and screwed onto the external thread, this being made more difficult by the fact that neither of the two threads is visible to the user.

In addition, it is possible, for example, for movement-induced skewing of the outer plunger part with the stop to render the rescrewing of the internal thread onto the external thread more difficult, or even impossible. Furthermore, the possibility of releasing the threaded connection gives rise to a relatively complex construction.

WO 2012/128730 A2 discloses a furniture fitting which likewise comprises a first plunger part with an internal thread and a second plunger part with an external thread, which interacts with the internal thread. In order to prevent the situation where the two plunger parts can become released from one another, an arrester is provided, and this arrester, starting from the first plunger part, projects through the second plunger part to the end of the latter, where it has a widened portion. This widened portion prevents the arrester from passing out through the second plunger part. This complex construction is clearly capable of improvement. In particular, it is necessary during production of such a furniture fitting for the arrester to be arranged in the second plunger part in the first instance, before it can be connected to the first plunger part. This connection, however, is not straightforward to establish, since the two plunger parts make it difficult to access the appropriate location.

It is therefore an object of the present invention to provide a furniture fitting of which the length-adjustable plunger has a straightforward construction and straightforward and reliable operation.

SUMMARY OF THE INVENTION

The above object is achieved by providing a securing element which prevents the external thread from being unscrewed all the way out of the internal thread. In other words, the length adjustment of the plunger is facilitated by the interaction of the external thread and internal thread at any point in time being guaranteed.

In a preferred embodiment, provision may be made for the securing element to be arranged at an inner lateral surface of the first plunger part, the internal thread also being arranged on the inner lateral surface.

Particularly straightforward installation of the furniture fitting can be achieved by the securing element being designed in the form of a one-way resilient tongue, which is arranged on the first plunger part.

A particularly reliable connection between the plunger parts can be achieved by the securing element being designed in the form of a push-in catch on the first plunger part.

A preferred embodiment is one in which the securing element is designed in the form of a collar. This simplifies the production of the first plunger part and of the furniture fitting.

It may be particularly efficient here if the collar is arranged on the first plunger part, and if a diameter of the collar is smaller than an external diameter of the external thread.

In order to reduce friction, and for aesthetic reasons, one thread—preferably the external thread—can be shorter than the other thread—preferably the internal thread.

Similarly, it may be optically advantageous if the first plunger part is oriented away from the housing.

For particularly cost-effective production, the first plunger part, the second plunger part, or the securing element may be produced from plastics material.

It may also be beneficial to straightforward production if the first plunger part is formed in one piece—preferably with the securing element.

Particularly when the first plunger part is produced by injection molding, the first plunger part may have at least one film hinge, wherein the internal thread is present when the at least one film hinge is closed. The first plunger part can then be injection molded in the open state, as a result of which the long cycle times involved in genuine thread molding are avoided.

In order to keep the material consumption to as low a level as possible here, the at least one film hinge can run in the direction of a longitudinal axis of the internal thread or of a transverse axis, which is transverse to the longitudinal axis of the internal thread.

In order to guarantee particularly soft closure of, for example, doors, the furniture fitting may be configured in the form of a damper unit with a movable plunger. A particularly preferred embodiment here is one in which the damper unit is designed in the form of a linear damper, which is configured preferably in the form of a fluid-damper unit with a piston/cylinder unit, in which a damper fluid—preferably oil or air—is provided.

It is also conceivable, in principle, to configure the furniture fitting in the form of spring units or spring/damper combinations.

Other stop dampers in the form of a touch-latch unit are particularly preferable because these allow a particularly convenient operation. It is particularly in this case that the "latch" function can be implemented particularly straightforwardly by the plunger having a magnet.

Protection is also sought for a piece of furniture having a furniture fitting according to the invention.

BRIEF DESCRIPTION OF THE DRAWINGS

Further advantages and details of the invention can be gathered from the figures and from the associated descriptions of the figures. In the figures:

FIGS. 2a and 2b show sectional illustrations of a damper unit according to the invention, FIGS. 4a to 4f show various illustrations of a third embodiment of a first plunger part according to the invention, FIGS. 5a to 5d show a fourth embodiment of a first plunger part according to the invention, FIGS. 8a to 8l show various illustrations relating to the installation of a first plunger part in the fifth embodiment.

DETAILED DESCRIPTION OF THE INVENTION

Figure 1A:
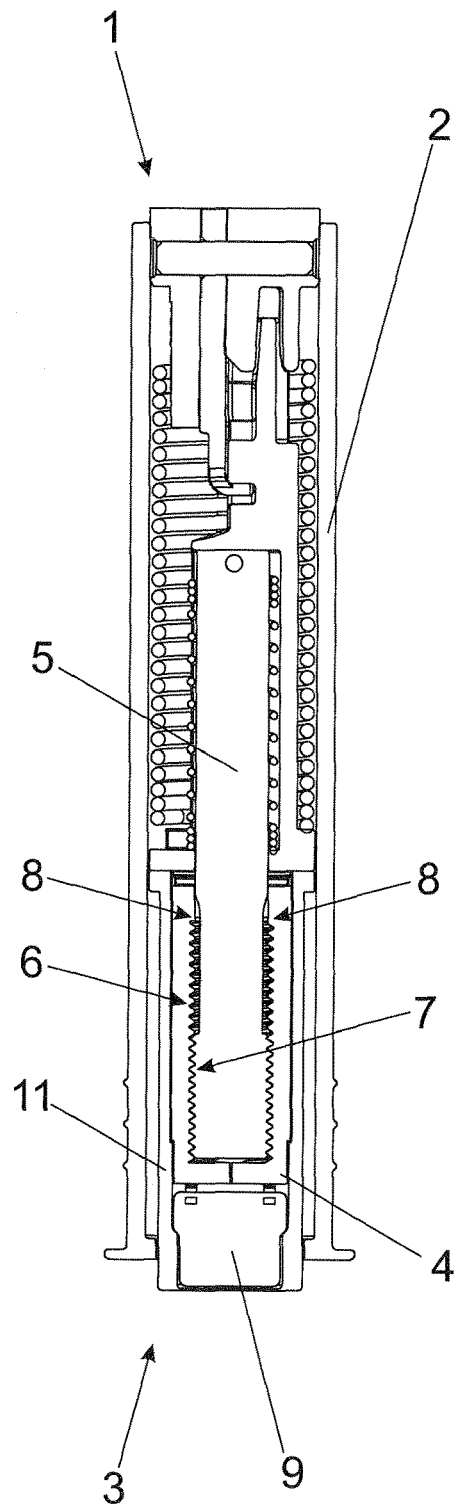
FIGS. 1a to 1d show sectional illustrations and perspective illustrations of touch-latch units according to the invention.
Figure 1B:
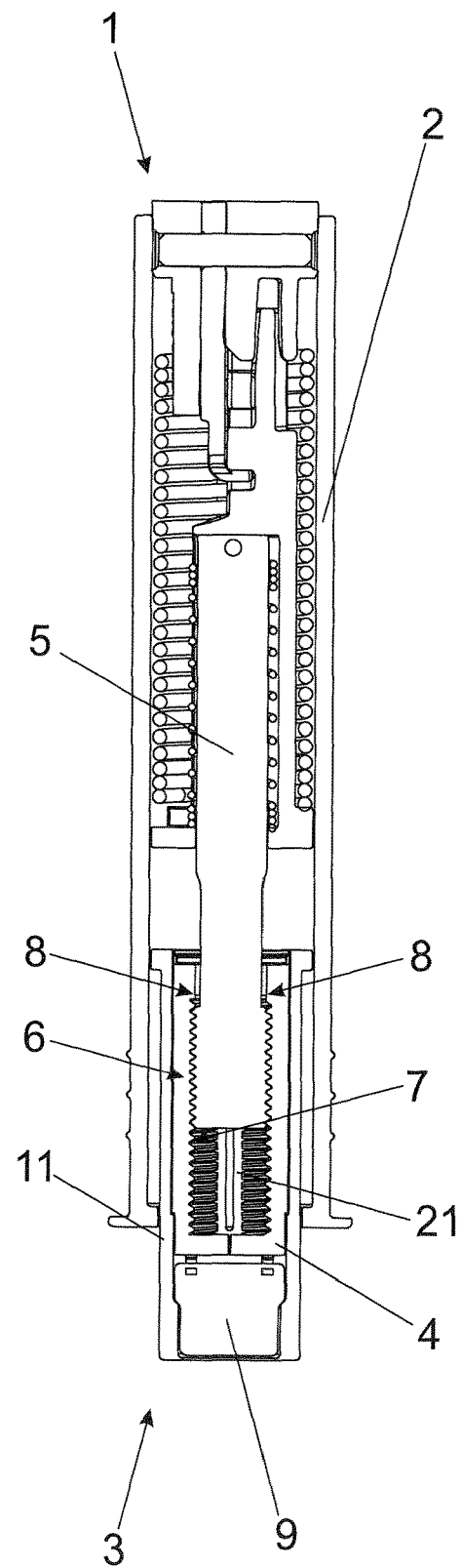

FIGS. 1a and 1b are sectional illustrations of a touch-latch unit according to the invention. This furniture fitting 1 has a housing 2 and a plunger 3. The plunger in turn comprises a first plunger part 4 and a second plunger part 5, which are connected to one another by an internal thread 6 and an external thread 7 which interacts therewith, for the length adjustment of the plunger 3. FIG. 1a illustrates the plunger 3 in the fully screwed-in state. In FIG. 1b, the first plunger part 4 has been unscrewed virtually all the way out, wherein release of the threaded connection is prevented by the securing element 8.

For the purpose of fastening a magnet 9, and for aesthetic reasons, a sleeve 11 is located over the first plunger part 4.

Figure 1C:
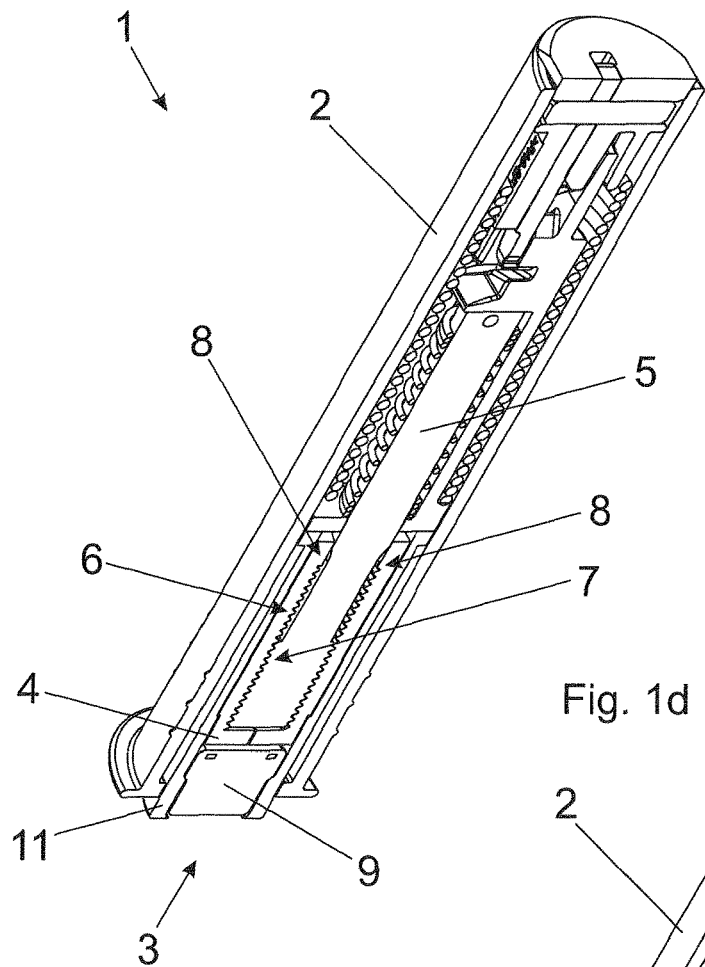
Figure 1D:
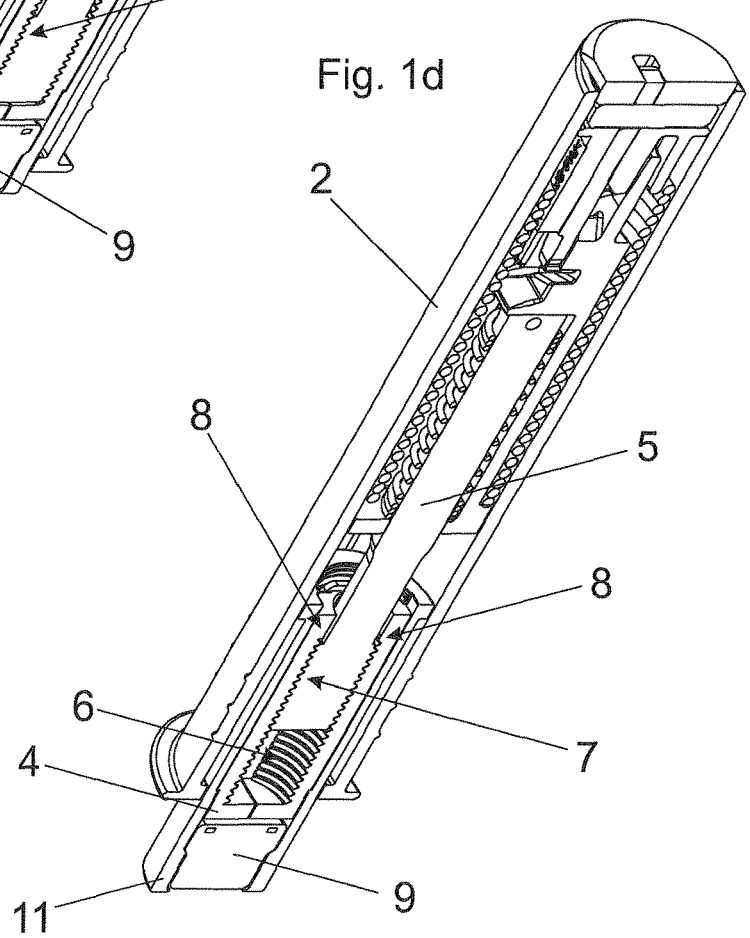

Two perspective illustrations follow, wherein FIG. 1c corresponds to FIG. 1a and FIG. 1d corresponds to FIG. 1b. Here, and hereinbelow, corresponding parts have the same reference numbers.

FIG. 2a then depicts a damper unit according to the invention, wherein the securing element 8, once again, is configured in the form of a collar at the end of the internal thread 7. In particular, in the detailed view of FIG. 2b, it can be seen how the internal diameter d of the collar is smaller than the external diameter D of the external thread, and the external thread is thereby prevented from being unscrewed all the way out of the internal thread.

In the case of all the embodiments illustrated in the figures, the internal thread 6 is arranged on the inner lateral surface 21 of the first plunger part 4. Likewise common to all the embodiments is the fact that the securing element 8 is arranged on the inner lateral surface 21. FIG. 2b uses dashed lines to indicate the inner lateral surface 21 schematically.

Figure 3A:
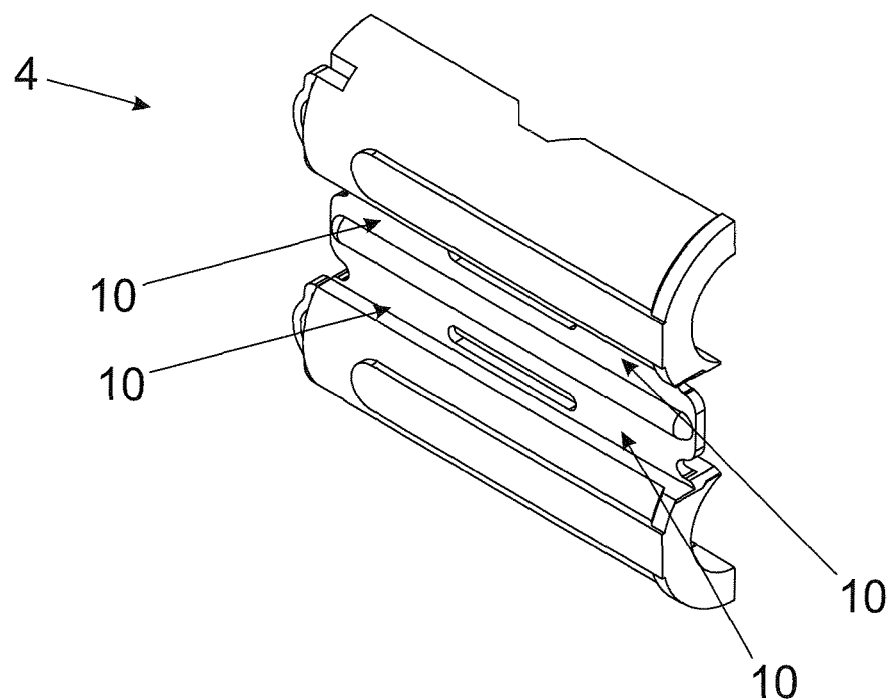
FIGS. 3a to 3d show various illustrations of a second embodiment of a first plunger part according to the invention.
Figure 3B:
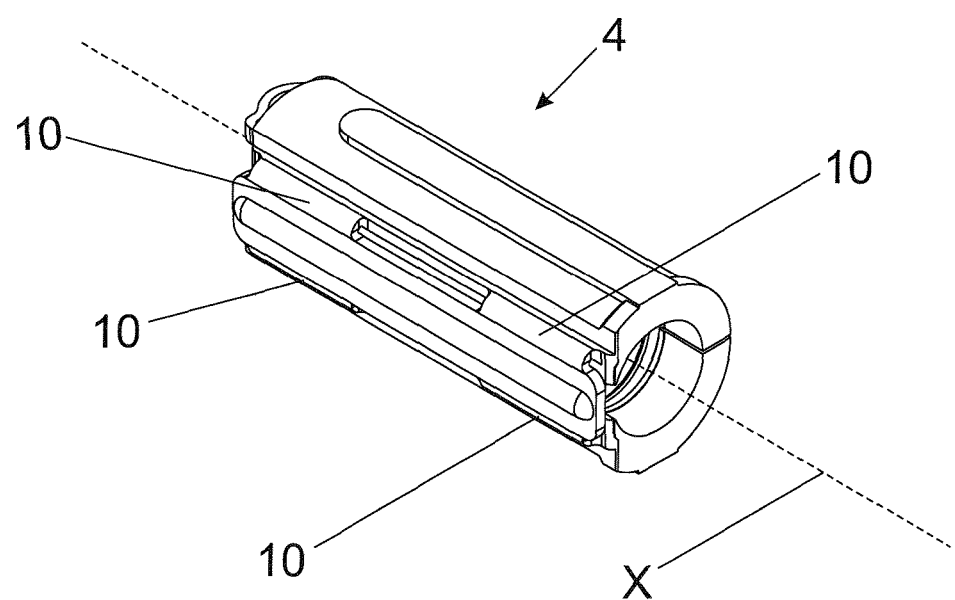
Figure 3C:
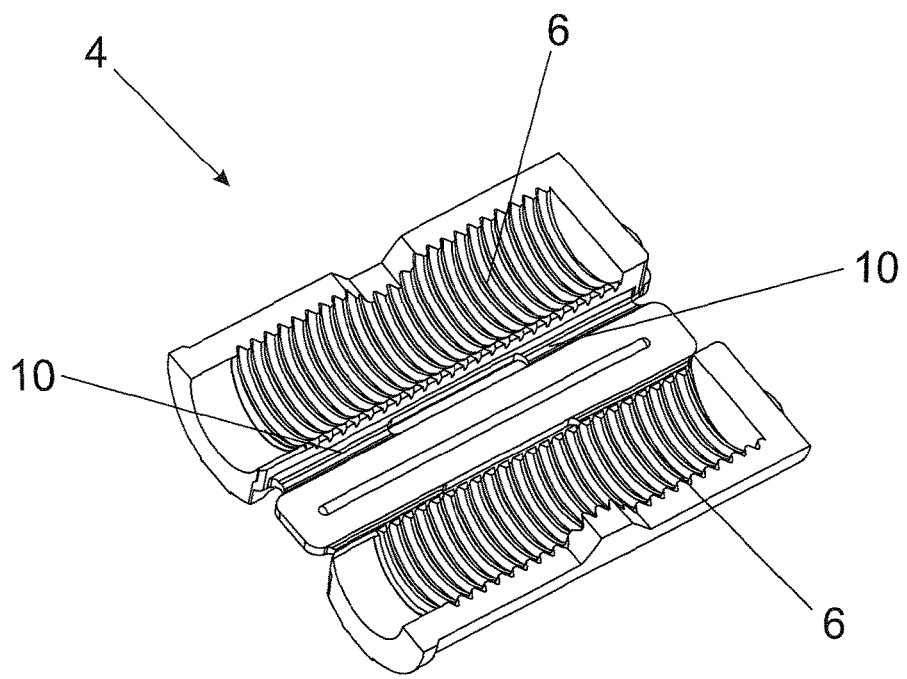
Figure 3D:
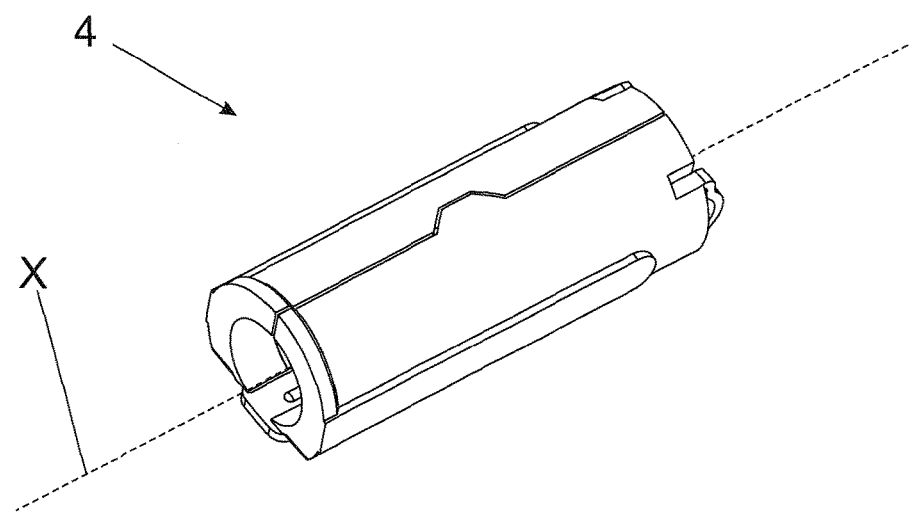

FIGS. 3a to 3d then show a second embodiment of the first plunger part, this time with film hinges 10. FIGS. 3a and 3b show the first plunger part in the open position of the film hinge, and FIGS. 3b and 3d show the closed position of a film hinge. In this embodiment, the film hinges run parallel to a longitudinal axis X.

Figure 4D:
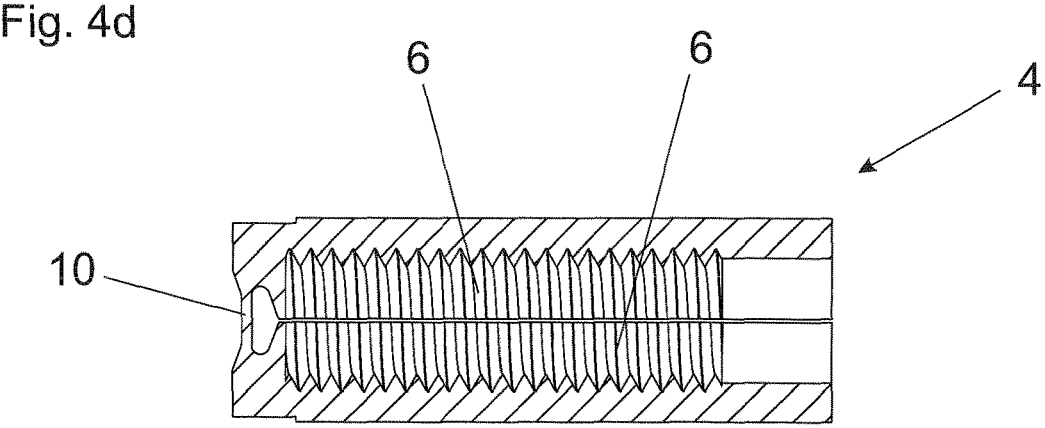
Figure 4E:
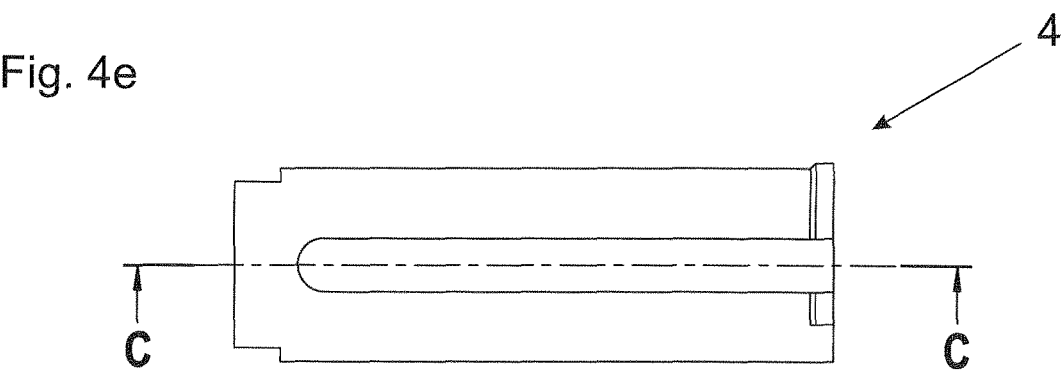
Figure 4F:
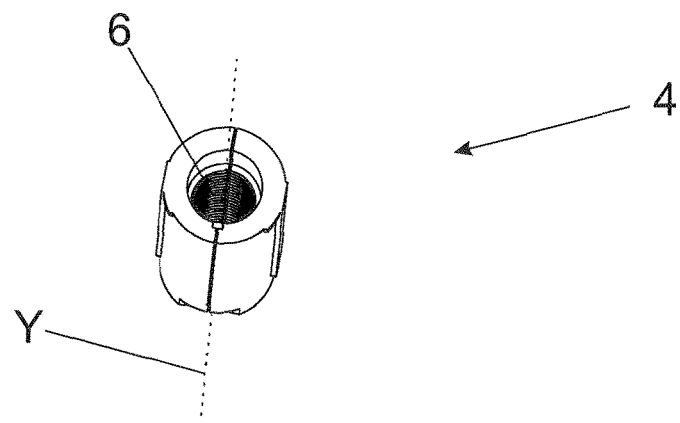
Figure 6A:
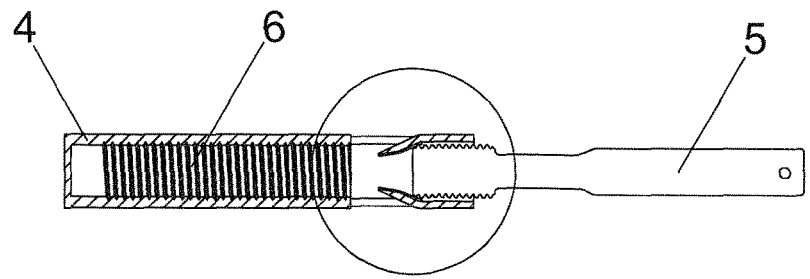
FIGS. 6a to 6d show a clarification of the installation of a first plunger part in the fourth embodiment.
Figure 6B:
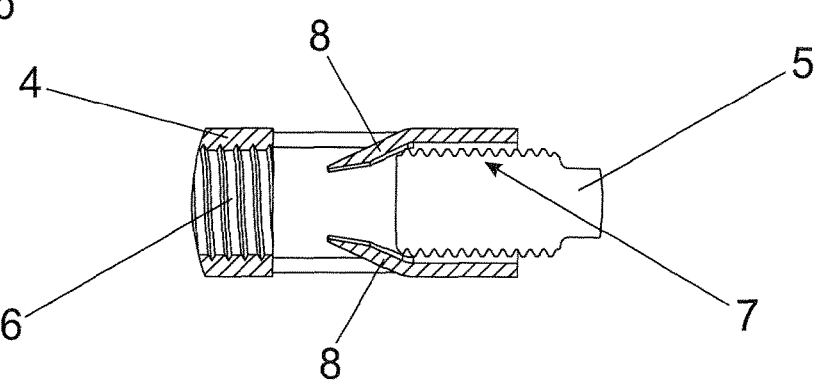
Figure 6C:
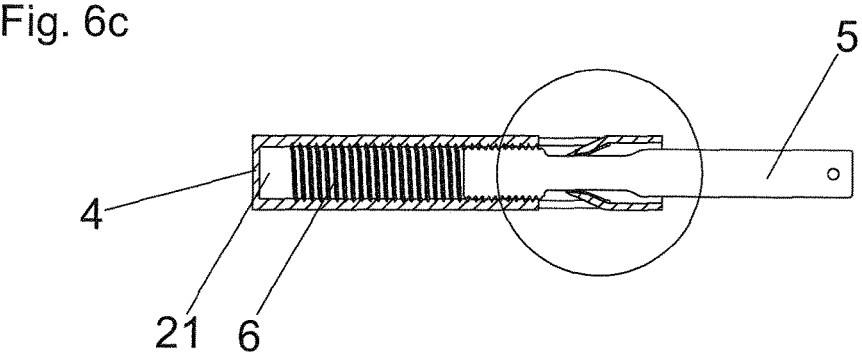
Figure 6D:
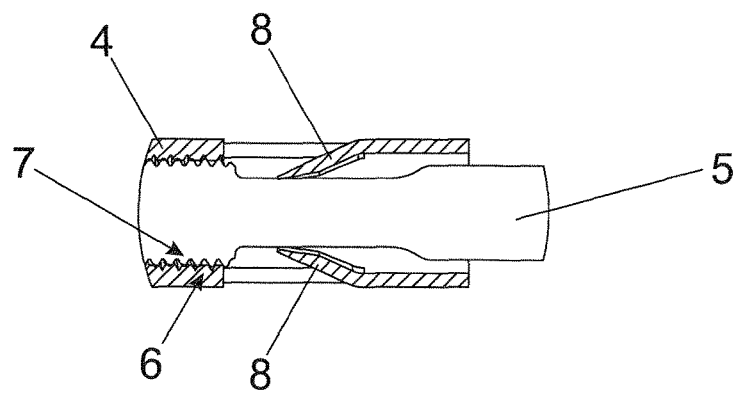
Figure 7A:
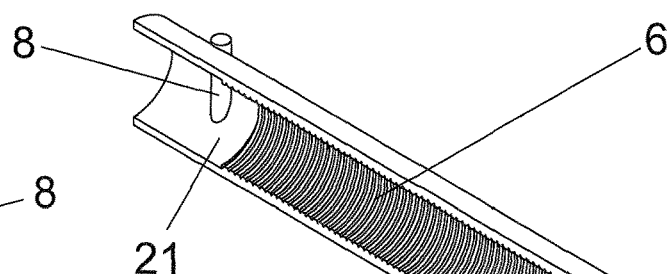
FIGS. 7a to 7e show various illustrations of a fifth embodiment of a first plunger part.
Figure 7B:
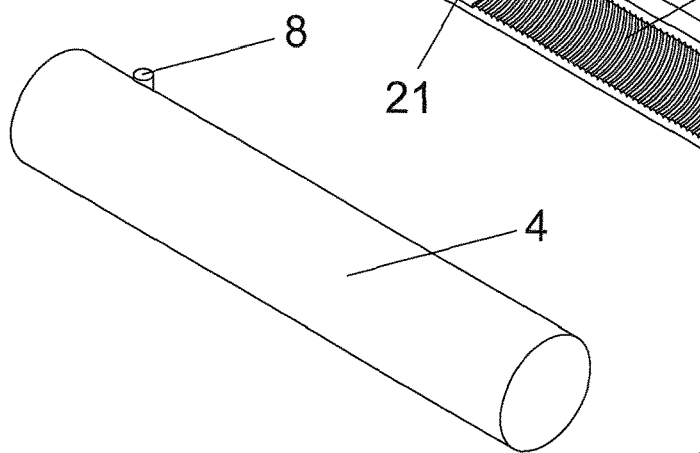
Figure 7C:
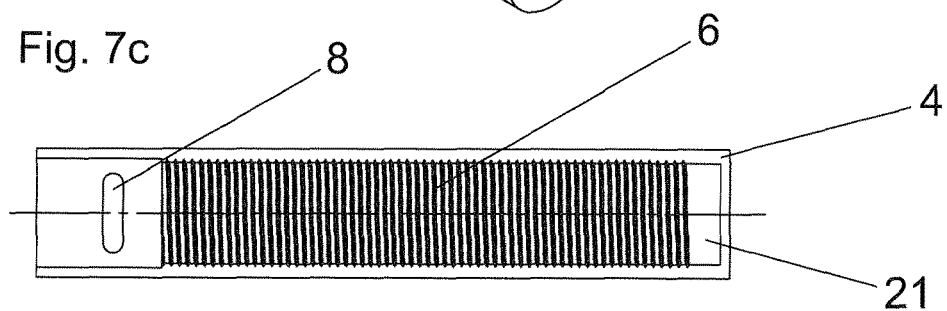
Figure 7D:
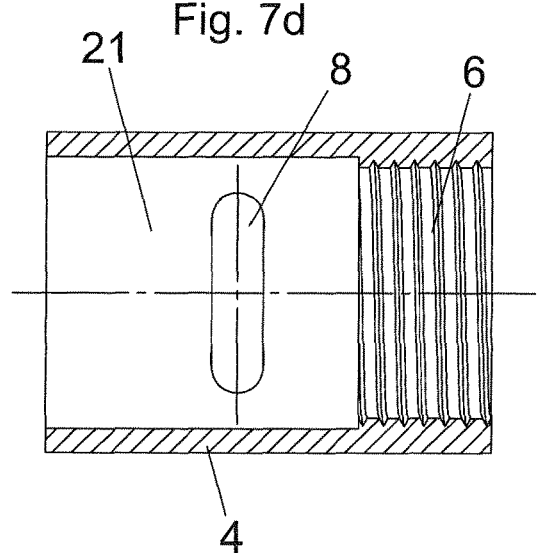
Figure 7E:
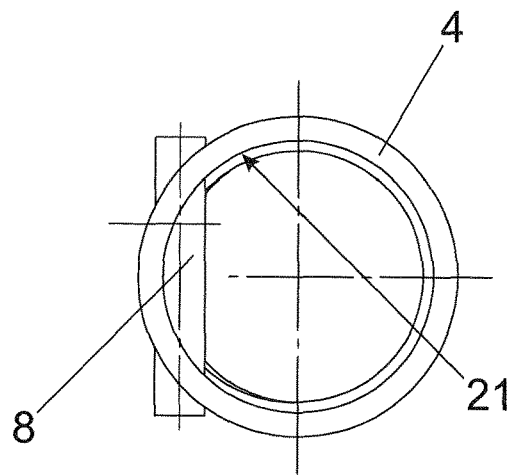
Figure 8A:
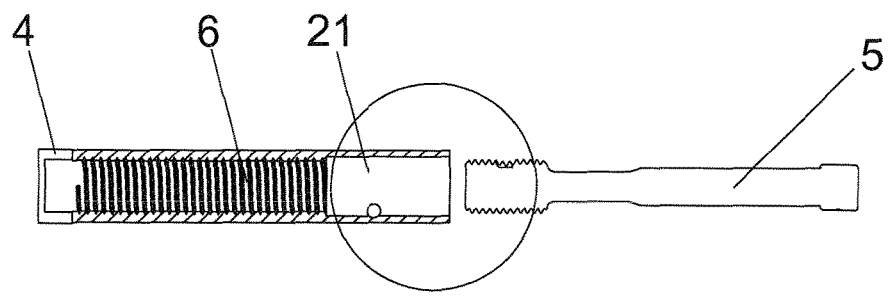
Figure 8B:
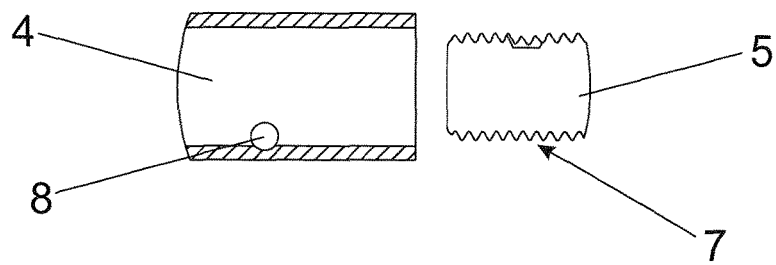
Figure 8C:
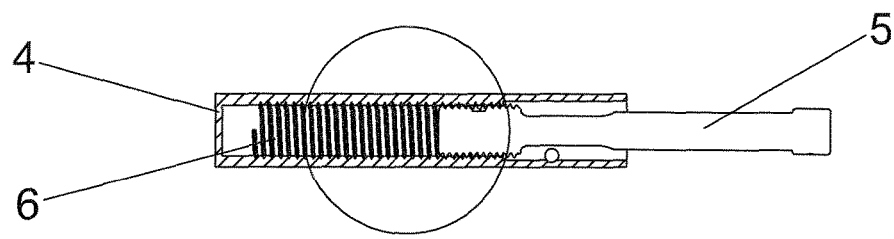
Figure 8D:
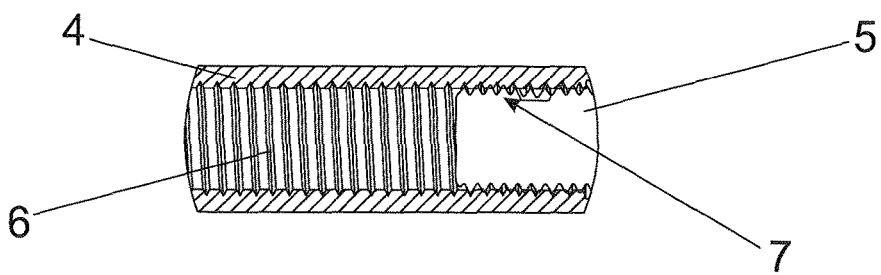
Figure 8E:
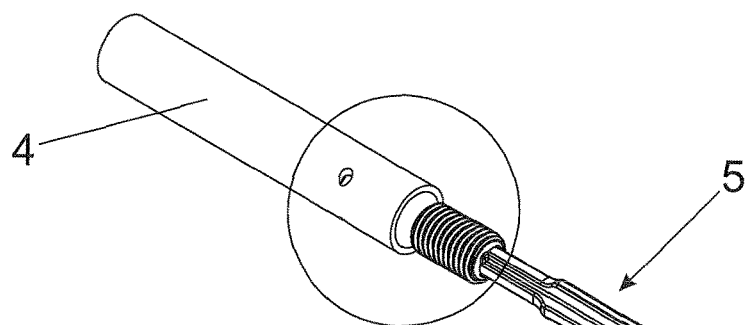
Figure 8F:
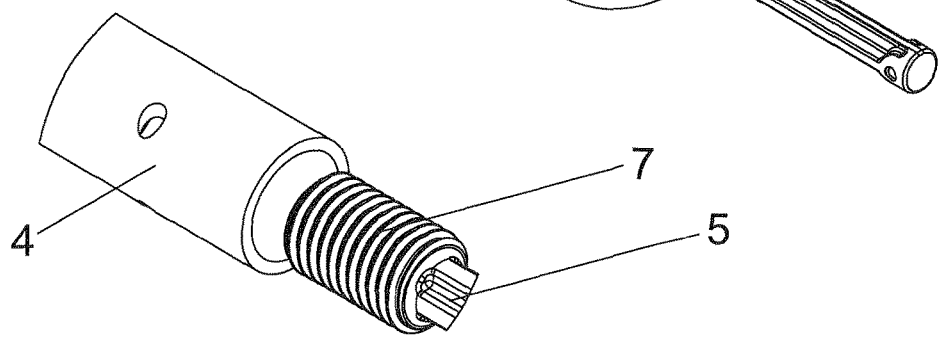
Figure 8G:
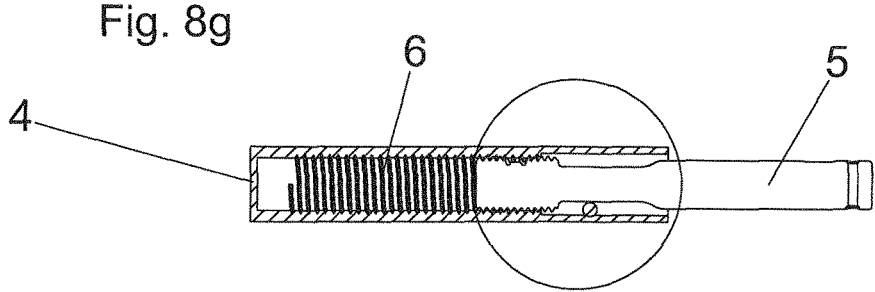
Figure 8H:
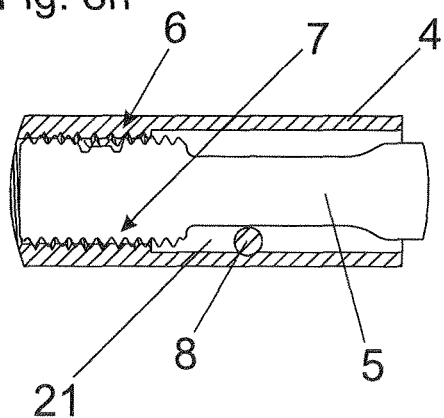
Figure 8I:
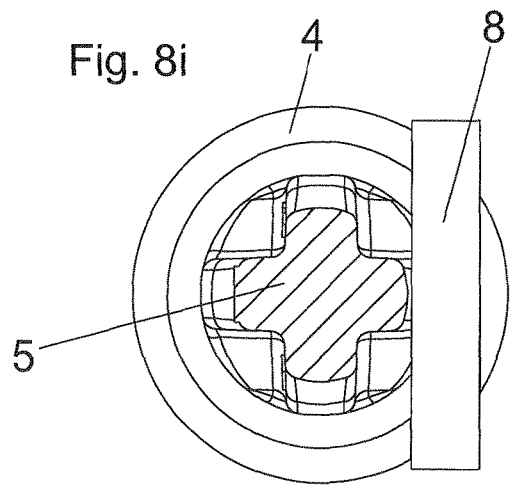
Figure 8K:
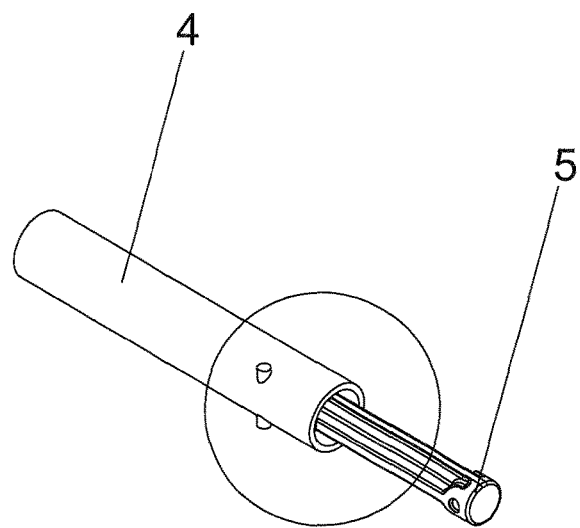
Figure 8L:
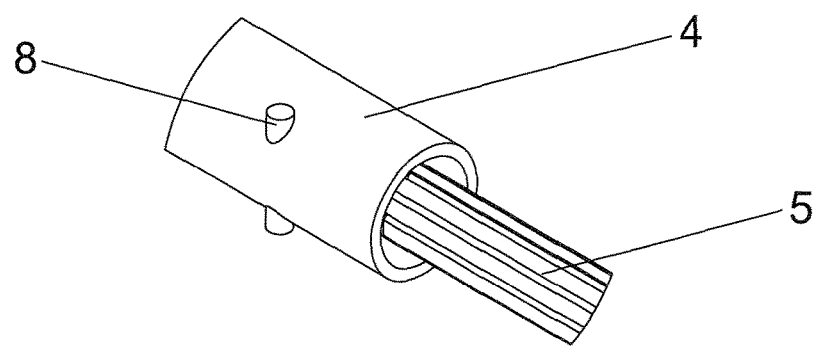

FIGS. 4a to 4f show various illustrations of a third embodiment of a first plunger part 4, in which the film hinge 10 runs along a transverse axis Y. The transverse axis Y is transverse to an imaginary longitudinal axis X. FIG. 4c here is a sectional illustration along plane D, which can be seen in FIG. 4b. Similarly, FIG. 4d is a sectional illustration through plane C, which can be seen in FIG. 4e.

FIGS. 5a to 5d show a further embodiment, in which the securing element 8 is configured in the form of a one-way resilient tongue. FIG. 5d here is an enlarged illustration from FIG. 5c. FIGS. 6a to 6d then illustrate the installation of this embodiment. During the screwing-in action (see FIG. 6a and the detail view of FIG. 6b), the one-way resilient tongue is bent back until the external thread 7 passes by the second plunger part 5. The external thread 7 and the internal thread 6 are then in engagement. Thereafter, however, release is no longer possible, since the one-way resilient tongues 8 are configured such that, when the threads are unscrewed all the way, the tongues do not spring back and therefore block the unscrewing movement.

FIGS. 7a to 7e then show a fifth embodiment of the first plunger part. The securing element 8 here is designed in the form of a push-in catch. The installation is illustrated in FIGS. 8a to 8l. The first plunger part is brought together with the second plunger part, and the catch has not yet been pushed in. Once the external thread has been screwed into the internal thread (FIGS. 8a to 8f), the catch is pushed in (see, in particular, FIGS. 8k and 8l) and blocks a complete unscrewing.

Figure 9:
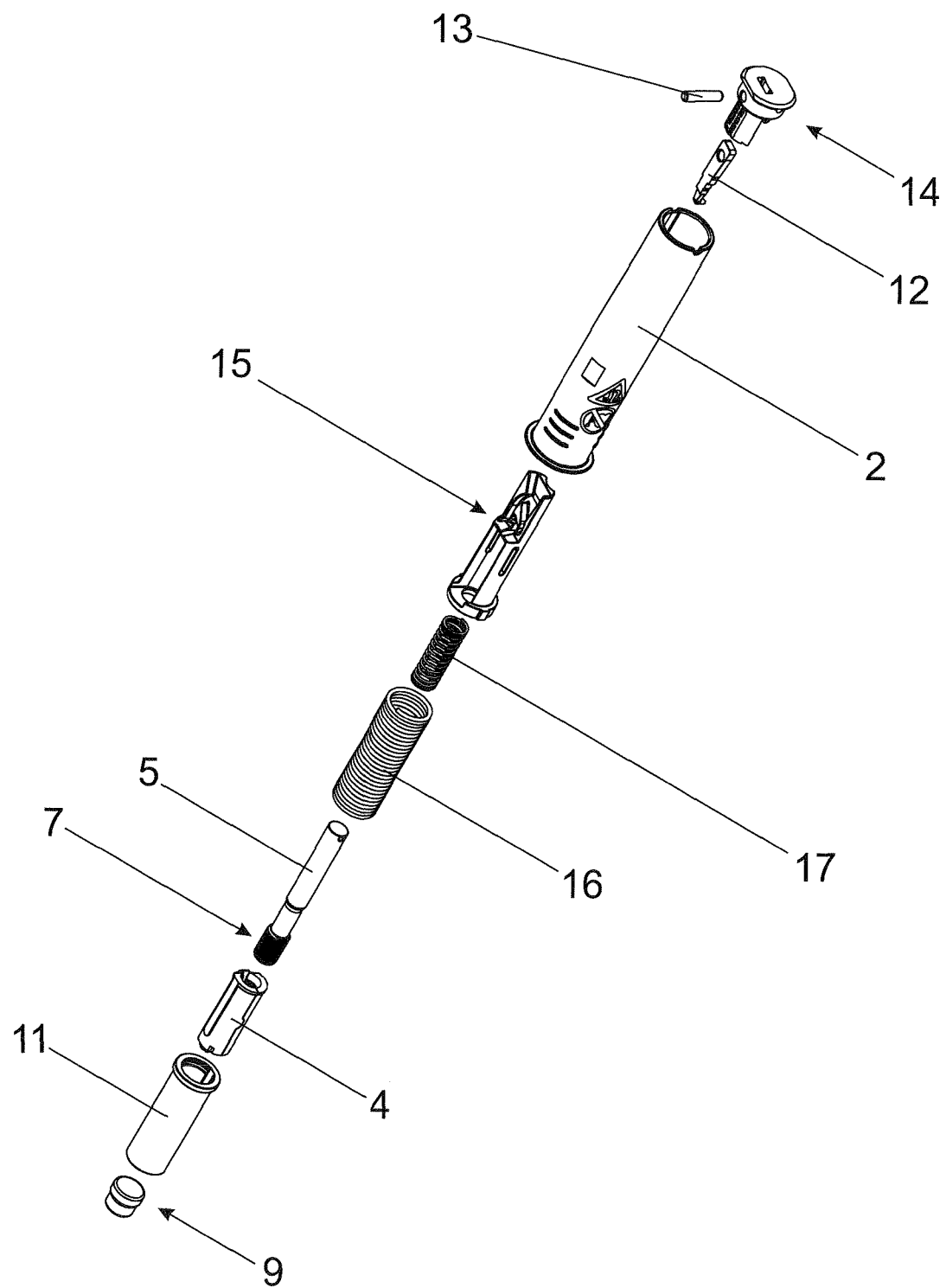
FIG. 9 shows an exploded illustration of a touch-latch unit from FIG. 1.

The exploded illustration in FIG. 9 illustrates the touch-latch unit which is known from FIGS. 1a to 1d. Alongside the parts which are already known, this figure shows a first spring 16, a second spring 17, a profile part 15, a lever 12 and a housing closure 14, to which the lever 12 is connected by a bolt 13. The touch-latch function is implemented by virtue of the first spring 16 being prestressed and of the lever 12 engaging in the profile of the profile part 15. If the touch-latch unit is then in the closed, prestressed position, the second spring 17 prevents the touch-latch unit from triggering if the plunger is subjected to pulling action with only a small amount of force. In particular in the case of a furniture door being shut hard, this prevents the door from opening again of its own accord.

Figure 10:
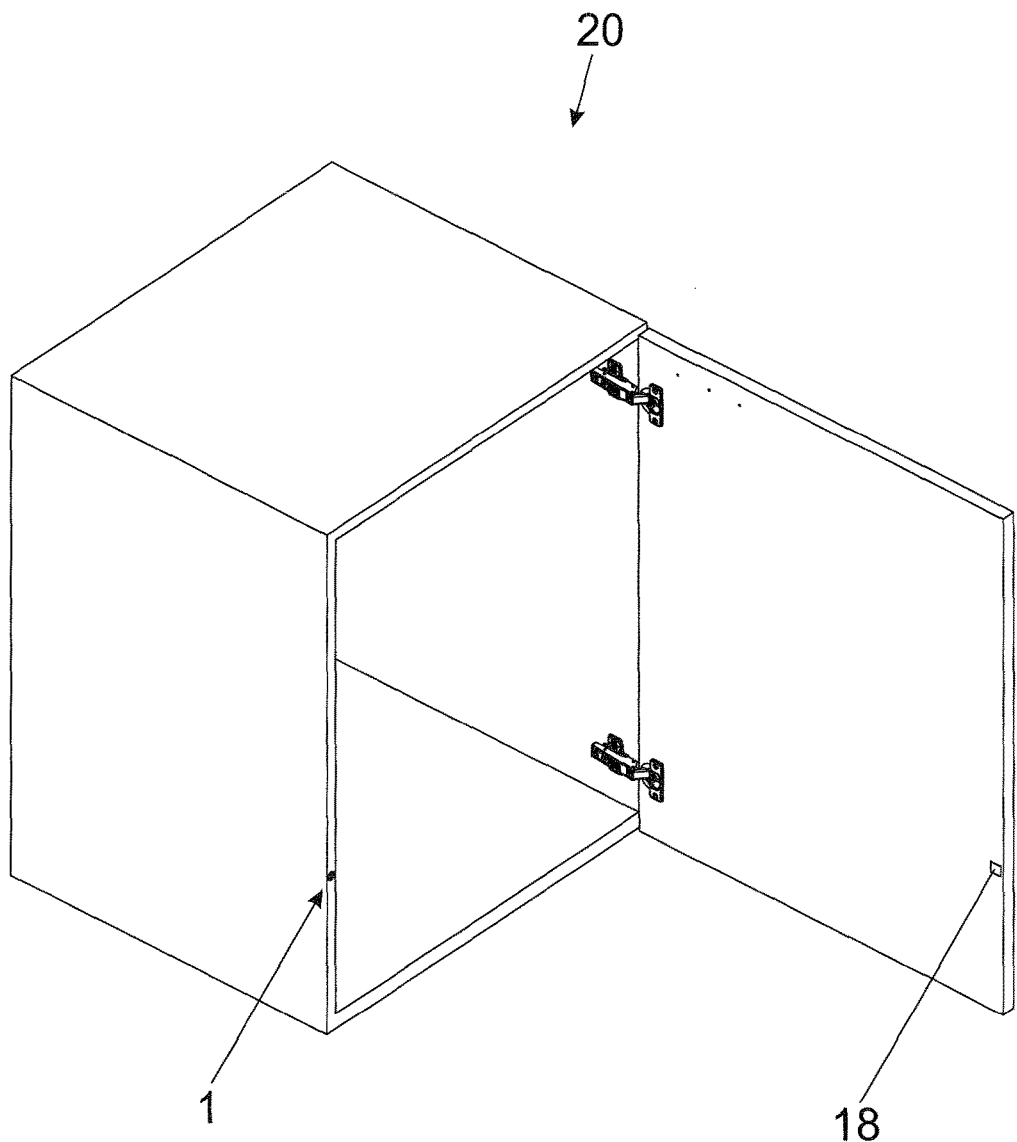
FIG. 10 shows a piece of furniture having a touch-latch unit according to the invention.

FIG. 10 illustrates a piece of furniture 20 having a furniture fitting 1 according to the invention. The furniture fitting 1 here is configured in the form of a touch-latch unit with a magnet 9. A magnet counterpart 18 is located in the door of the piece of furniture and interacts with the magnet 9, the keeping-closed function of the touch-latch unit being realized as a result.

The invention is not restricted to the present exemplary embodiments. In particular, it is also possible for a stop damper according to the invention to be used for doors other than the doors of a piece of furniture. Similarly, it is readily possible for the internal thread to be located on the plunger part which is oriented in the direction of the housing.

The invention claimed is:

1. A furniture fitting comprising:
   a housing;
   a plunger moveable linearly in relation to the housing, the plunger including a first plunger part having an internal thread and a second plunger part having an external thread interacting with the internal thread, the plunger being configured to allow adjustment of a length of the plunger by subjecting the external thread of the second plunger part to screwing action relative to the internal thread of the first plunger part; and
   a securing element configured to prevent the external thread from being unscrewed all the way out of the internal thread,
   wherein the internal thread is arranged on an inner lateral surface of the first plunger part, and the securing element is arranged at the inner lateral surface of the first plunger part.

2. The furniture fitting as claimed in claim 1, wherein the securing element is formed as a push-in catch on the first plunger part.

3. The furniture fitting as claimed in claim 1, wherein one of the internal thread and the external thread is shorter than the other thread.

4. The furniture fitting as claimed in claim 3, wherein the external thread is shorter than the internal thread.

5. The furniture fitting as claimed in claim 1, wherein the first plunger part is oriented away from the housing.

6. The furniture fitting as claimed in claim 1, wherein the plunger has a magnet.

7. The furniture fitting as claimed in claim 1, wherein at least one of the first plunger part, the second plunger part, and the securing element is produced from plastics material.

8. The furniture fitting as claimed in claim 1, wherein the first plunger part is integrally formed to have a one piece construction.

9. The furniture fitting as claimed in claim 8, wherein the first plunger part is formed in one piece with the securing element such that the first plunger part and the securing element are integrally formed to have a one-piece construction.

10. The furniture fitting as claimed in claim 1, wherein the furniture fitting is a damper unit with the plunger.

11. The furniture fitting as claimed in claim 10, wherein the damper unit is a linear damper.

12. The furniture fitting as claimed in claim 11, wherein the linear damper, which is a fluid-damper unit comprising a piston/cylinder unit having a damper fluid.

13. The furniture fitting as claimed in claim 1, wherein the furniture fitting is a touch-latch unit.

14. A piece of furniture comprising a furniture fitting as claimed in claim 1.

15. A furniture fitting comprising:
a housing;
a plunger moveable linearly in relation to the housing, the plunger including a first plunger part having an internal thread and a second plunger part having an external thread interacting with the internal thread, the plunger being configured to allow adjustment of a length of the plunger by subjecting the external thread of the second plunger part to screwing action relative to the internal thread of the first plunger part; and
a securing element configured to prevent the external thread from being unscrewed all the way out of the internal thread,
wherein the securing element is formed as a one-way resilient tongue arranged on the first plunger part.

16. A furniture fitting comprising:
a housing;
a plunger moveable linearly in relation to the housing, the plunger including a first plunger part having an internal thread and a second plunger part having an external thread interacting with the internal thread, the plunger being configured to allow adjustment of a length of the plunger by subjecting the external thread of the second plunger part to screwing action relative to the internal thread of the first plunger part; and
a securing element configured to prevent the external thread from being unscrewed all the way out of the internal thread,
wherein the securing element is formed as a collar arranged on the first plunger part, and a diameter of the collar is smaller than an external diameter of the external thread.

17. A furniture fitting comprising:
a housing;
a plunger moveable linearly in relation to the housing, the plunger including a first plunger part having an internal thread and a second plunger part having an external thread interacting with the internal thread, the plunger being configured to allow adjustment of a length of the plunger by subjecting the external thread of the second plunger part to screwing action relative to the internal thread of the first plunger part; and
a securing element configured to prevent the external thread from being unscrewed all the way out of the internal thread,
wherein the first plunger part has at least one film hinge, the internal thread being formed when the at least one film hinge is closed.

18. The furniture fitting as claimed in claim 17, wherein the at least one film hinge extends in a direction of a longitudinal axis of the internal thread.

19. The furniture fitting as claimed in claim 17, wherein the at least one film hinge runs in a direction of a transverse axis transverse to a longitudinal axis of the internal thread.

* * * * *